(12) United States Patent
Urscheler et al.

(10) Patent No.: US 7,693,888 B2
(45) Date of Patent: Apr. 6, 2010

(54) DATA SYNCHRONIZER WITH FAILOVER FACILITY

(75) Inventors: Roger Urscheler, Boca Raton, FL (US);
Rodrigo Pastro, Boca Raton, FL (US);
Geert Fieremans, Boca Raton, FL (US);
Sajeeve Jose, Greenacres, FL (US)

(73) Assignee: Siemens Communications, Inc., Boca Raton, FL (US)

( * ) Notice: Subject to any disclaimer, the term of this patent is extended or adjusted under 35 U.S.C. 154(b) by 762 days.

(21) Appl. No.: 11/125,546

(22) Filed: May 10, 2005

(65) Prior Publication Data

US 2006/0259517 A1 Nov. 16, 2006

(51) Int. Cl.
*G06F 7/00* (2006.01)
(52) U.S. Cl. ...................... 707/634; 707/610
(58) Field of Classification Search .......... 707/201, 707/200, 204
See application file for complete search history.

(56) References Cited

U.S. PATENT DOCUMENTS

| | | | | |
|---|---|---|---|---|
| 5,341,498 A * | 8/1994 | Connor et al. | ........... | 707/104.1 |
| 5,870,765 A * | 2/1999 | Bauer et al. | ........... | 707/203 |
| 5,974,238 A * | 10/1999 | Chase, Jr. | ........... | 709/248 |
| 6,000,000 A * | 12/1999 | Hawkins et al. | ........... | 707/201 |
| 6,026,408 A * | 2/2000 | Srinivasan et al. | ...... | 707/103 R |
| 6,189,045 B1 | 2/2001 | O'Shen et al. | | |
| 6,199,068 B1 * | 3/2001 | Carpenter | ........... | 707/100 |
| 6,226,650 B1 * | 5/2001 | Mahajan et al. | ........... | 707/201 |
| 6,446,075 B1 | 9/2002 | Velasco | | |
| 6,449,695 B1 * | 9/2002 | Bereznyi et al. | ........... | 711/134 |
| 6,453,404 B1 * | 9/2002 | Bereznyi et al. | ........... | 711/171 |
| 6,631,382 B1 | 10/2003 | Kouchi et al. | | |
| 6,684,219 B1 | 1/2004 | Shaw et al. | | |
| 6,721,735 B1 * | 4/2004 | Lee | ........... | 707/5 |
| 6,721,740 B1 * | 4/2004 | Skinner et al. | ........... | 707/10 |
| 7,328,222 B2 * | 2/2008 | Keith et al. | ........... | 707/103 R |
| 7,401,104 B2 * | 7/2008 | Shah et al. | ........... | 707/204 |
| 7,620,658 B2 * | 11/2009 | Benson et al. | ........... | 707/200 |
| 2002/0073236 A1 * | 6/2002 | Helgeson et al. | ........... | 709/246 |
| 2002/0087588 A1 * | 7/2002 | McBride et al. | ........... | 707/204 |
| 2002/0112083 A1 * | 8/2002 | Joshi et al. | ........... | 709/248 |
| 2003/0050910 A1 * | 3/2003 | Ramanujam et al. | ........... | 707/1 |
| 2003/0142128 A1 | 7/2003 | Reulein et al. | | |
| 2003/0144982 A1 | 7/2003 | Reulein et al. | | |
| 2003/0187995 A1 * | 10/2003 | Fok et al. | ........... | 709/227 |
| 2003/0225747 A1 | 12/2003 | Brown et al. | | |
| 2003/0229644 A1 * | 12/2003 | Natarajan et al. | ........... | 707/102 |
| 2004/0073831 A1 * | 4/2004 | Yanai et al. | ........... | 714/7 |
| 2004/0093342 A1 * | 5/2004 | Arbo et al. | ........... | 707/102 |

(Continued)

OTHER PUBLICATIONS

Molli, Pascal, et al., "Using the Transformational Approach to Build a Safe and Generic Data Synchronizer", GROUP'03, Sanibel Island, FL, Nov. 9-12, 2003, pp. 212-220.*

(Continued)

*Primary Examiner*—Robert Stevens

(57) ABSTRACT

A data management system with data stored in multiple disparate formats in synchronized stores, method of synchronizing the data and recovering from synchronization failures and program product therefor. Data changes in one data store are cached in a universal format in an active synchronizer and forwarded to a second store from the universal format cache. Standby synchronizers provide failover handling by identifying synchronization failures and self-selecting a replacement synchronizer to serve as the active synchronizer.

25 Claims, 7 Drawing Sheets

U.S. PATENT DOCUMENTS

| | | | |
|---|---|---|---|
| 2004/0098546 A1* | 5/2004 | Bashant et al. | 711/156 |
| 2004/0153576 A1* | 8/2004 | Hansmann et al. | 709/248 |
| 2004/0199536 A1 | 10/2004 | Barnes et al. | |
| 2004/0205656 A1 | 10/2004 | Reulein et al. | |
| 2004/0225680 A1* | 11/2004 | Cameron et al. | 707/104.1 |
| 2005/0038779 A1 | 2/2005 | Fernandez et al. | |
| 2005/0050087 A1 | 3/2005 | Milenova et al. | |
| 2005/0055382 A1* | 3/2005 | Ferrat et al. | 707/201 |
| 2005/0065977 A1* | 3/2005 | Benson et al. | 707/104.1 |
| 2005/0099963 A1* | 5/2005 | Multer et al. | 370/254 |
| 2005/0216524 A1* | 9/2005 | Gomes et al. | 707/201 |
| 2005/0223047 A1* | 10/2005 | Shah et al. | 707/201 |
| 2006/0013368 A1* | 1/2006 | LaBaw | 379/88.13 |
| 2006/0143497 A1* | 6/2006 | Zohar et al. | 714/4 |

OTHER PUBLICATIONS

Microsoft Computer Dictionary, 5th Edition, Microsoft Press, Redmond, WA, © 2002, p. 276.*

Helal, Sumi, et al., "A Three-tier Architecture for Ubiquitous Data Access", AICCSA 2001, Beirut, Lebanon, Jun. 25-29, 2001, pp. 177-180.*

Rundensteiner, Elke A., et al., "Maintaining Data warehouses Over Changing Information Sources", Communications of the ACM, vol. 43, Issue 6, Jun. 2000, pp. 57-62.*

Lei, Hui, et al., "DataX: An Approach to Ubiquitous Data Access", MCSA 1999, New Orleans, LA, Feb. 25-26, 1999, pp. 70-79.*

Lanham, M., et al., "Format-Independent change Detection and Propagation in Support of Mobile Computing", SBBD 2002, Gramado, Brazil, Oct. 14-17, 2002, pp. 27-41.*

* cited by examiner

```xml
<?xml version="1.0" encoding="utf-8"?>
<Root>
102 <Synchronizer>
114   <InConnector Library="inLdap.dll" Object="InConnLdap">
        <Settings>
          <Filter>(objectClass=user)</Filter>
        </Settings>
        <ObjectMapping Source="user" Target="UdcUser">
          <AttributeMapping PrimaryKey="true" Source="objectGUID" Target="udcUserGuid"/>
          <AttributeMapping Source="mail" Target="udcEmailAddr"/>
        </ObjectMapping>
      </InConnector>
116   <OutConnector Assembly="outSql.dll" Object="OutConnSql">
        <Settings>
          <Encrypt>ON</Encrypt>
        </Settings>
        <ObjectMapping Source="AdUser" Target="OSUSERDATA">
          <AttributeMapping PrimaryKey="true" Source="udcUserGuid" Target="employeeGuid"/>
          <AttributeMapping Source="udcEmailAddr" Target="emailAddress"/>
        </ObjectMapping>
      </OutConnector>
118   <ProgressConnector Assembly="progConn.dll" Object="ProgressConn">
        <Settings>
          <StoreLocation>server01.domain.com</StoreLocation>
        </Settings>
      </ProgressConnector>
    </Synchronizer>
</Root>
```

DATA SYNCHRONIZER WITH FAILOVER FACILITY

BACKGROUND OF THE INVENTION

1. Field of the Invention

The present invention is related to data management and more particularly, to reliably maintaining synchronized data stored in disparate data formats.

2. Background Description

Frequently, data is collected and shared amongst a number of applications. Each application may require presenting the data in a specific format, e.g., in a relational database, while another may require the same data as files stored hierarchically as a collection of files in central storage. Consequently, whenever data is being shared amongst a number of applications, it is likely that at least one application requires the data in a different format than the others. Thus, when data is shared by a number of applications, it is likely that the applications require the data in disparate formats. Accordingly, each format must be current and accurately reflect the same data content stored in each other format.

For example, a business concern may collect and maintain data for its employees, such as personnel, pay and user data. Each of the various applications, e.g., for presence based communications applications, personnel management applications and business communications applications, may require the data in a specific format that is different from and incompatible with the others. For example, one application may require hierarchically formatted data, e.g., stored in Active Directory. Another may require the data in a relational database, e.g., SQL Server. Status changes for each employee (e.g., an employee is promoted, dies or is terminated), require data updates the in each format in each store location and so, the data stores must be reliably synchronized.

Unfortunately, if synchronization is prevented/disrupted (i.e., the synchronization fails), old data may cause errors that may continue until the failure is subsequently discovered. Worse still, subsequent updates may obfuscate the failure and make recovery from such errors more difficult. For example, a terminated employee may be marked in personnel records as such, but continue to have remote access to company resources and sensitive information. Direct deposits may continue to a deceased employee's checking account long after some records reflect the employee's demise. Consequently, synchronizing shared data in disparate formats may be of critical importance.

Thus, there is a need for automatically synchronizing data stored in disparate formats and, more particularly, for automatically recovering from synchronization failures to shared data content stored in multiple disparate formats.

SUMMARY OF THE INVENTION

It is a purpose of the invention to reliably provide shared data in disparate formats;

It is another purpose of the invention to reliably synchronize contents of files in disparate formats storing shared data;

It is yet another purpose of the invention to seamlessly recover from failures in synchronizing contents of files storing shared data in disparate formats;

It is yet another purpose of the invention to automatically identify synchronization failures in synchronizing contents of files storing shared data in disparate formats and seamlessly recover from such failures.

The present invention relates to a data management system with data stored in multiple disparate formats in synchronized stores, method of synchronizing the data and recovering from synchronization failures and program product therefor. Data changes in one data store are cached in a universal format in an active synchronizer and forwarded to a second store from the universal format cache. Standby synchronizers provide failover handling by identifying synchronization failures and self-selecting a replacement synchronizer to serve as the active synchronizer.

BRIEF DESCRIPTION OF THE DRAWINGS

The foregoing and other objects, aspects and advantages will be better understood from the following detailed description of a preferred embodiment of the invention with reference to the drawings, in which:

FIG. 2 shows an example of a dynamically loaded XML configuration file;

DESCRIPTION OF PREFERRED EMBODIMENTS

Figure 1:
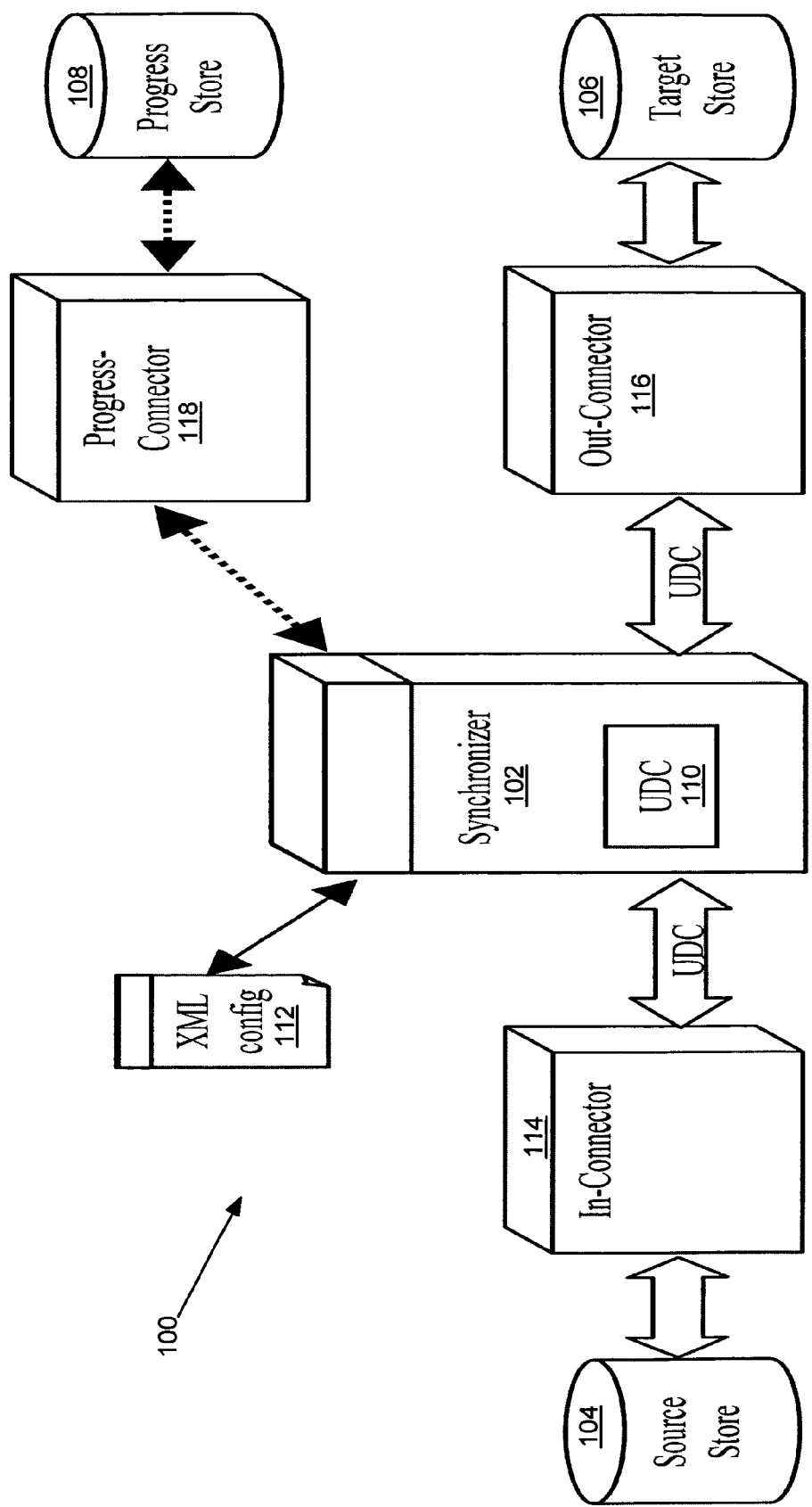
FIG. 1 shows an example of a preferred embodiment data synchronization system with a failover facility for maintaining data synchronization of shared data stored in multiple disparate formats.

Turning now to the drawings and more particularly, FIG. 1 shows an example of a preferred embodiment data management system 100 with failover facility for maintaining data synchronization of shared data stored in multiple disparate formats according to the present invention. The preferred data synchronization system 100 includes at least one active synchronizer 102 receiving data updates to shared data stored in a source store 104 in one format, e.g., in hierarchical format. The active synchronizer 102 caches updates in a universal format and forwards cached updates to one or more target store(s) 106 for storage in another format, e.g., in a relational database. In some applications serial synchronization may be desired, e.g., from a first store in a first format to a second store in a second format and, then, from the second store to a third store in a third format. For such serial applications, the active synchronizer 102 treats the second store as the target store 106 in the first synchronization and, then, as the source store 104 in the second synchronization. The active synchronizer 102 simultaneously monitors synchronization progress and logs the progress in a progress store 108. The active synchronizer 102 hosts and maintains an Universal Data Cache (UDC) 110 that caches updates. An extensible Markup Language (XML) configuration file 112 defines the UDC 110, an In-Connector 114 to the source store 104, an Out-Connector 116 for each target store 106 and a Progress-Connector 118 to the progress store 108. The connectors 114, 116, 118 may be dynamically created at runtime, for example, using the Reflection transformation in the NET framework from Microsoft Corporation.

For example, a preferred embodiment system may be deployable with two selectable modes as selected and defined by the XML configuration file 112. In a first mode the system may have as the source store 104 an extended schema capability in, for example, HiPath® OpenScape™ Active Directory (AD) Connector services from Siemens Communication Inc. In this first mode, the active synchronizer 102 may synchronize an SQL Server database in target store 106 with updates to the AD source store 104. In the second unextendable schema mode, the one store acts first as the target store 106 and then, as the source store 104. So first, the active synchronizer 102 may be synchronizing user data from the AD source store 104 into an Active Directory in Application Mode (ADAM) in target store 106. Then, the active synchronizer 102 synchronizes all data from ADAM target store 104 to the SQL target store 106.

Although shown with a single synchronizer 102 in this example, preferably, the data synchronization system 100 includes multiple synchronizers deployed on separate servers (not shown) sharing the progress store 108, with only one synchronizer 102 active at a given time and the other remaining synchronizer(s) in standby. The progress store 108 stores at least sufficient information to determine synchronization status and sufficient information to recover from an identified failure. For example, the progress store 108 may include an indicator (ReplicationInProgress) that identifies the state of the replication process; an active synchronizer ID (ActiveSynchronizer) that identifies which synchronizer currently is running in active mode; and, a timestamp (LastSynchronization) that indicates the time the last successful synchronization occurred. The progress store 108 can be of any type of storage. However, preferably, the progress store is an SQL database or XML file for dynamic modification. Accordingly, a static store such as an Active Directory is least preferred.

The active synchronizer 102 periodically synchronizes data between two data stores 104, 106, while all of the synchronizers monitor synchronization progress to intercept and recover from update failures. When the active synchronizer 102 fails to start a scheduled synchronization, the Progress-Connector 118 manages automatically self-selecting one standby synchronizer and designating the selected synchronizer as active, as described in more detail hereinbelow. The progress store 108 is shared by all synchronizers through the Progress-Connector 118. Since the progress store 108 is otherwise isolated from the active synchronizer 102, any data store (even the target store 106) may serve as the progress store 108.

In particular for the above HiPath® OpenScape™ example, the In-Connector 114 may be a generic Lightweight Directory Access Protocol (LDAP) In-Connector retrieving changes from AD and ADAM. This generic In-Connector may use standardized LDAP DirSync control to retrieve changes from the source store 104. The Out-Connector 106 may be a LDAP Out-Connector, for each update storing the data changes and cookie into the ADAM, i.e., for an ADAM target store 106. Since access to a SQL database target store 106 must be through the data access layer, the Out-Connector 116 to a SQL database target store 106 may be a generic SQL Out-Connector implemented in the HiPath® OpenScape™ Data Access Layer, for example.

FIG. 2 shows an example of a XML configuration file 112, e.g., from a computer-readable medium such as stores 104, 106 or 108, with library names and object names defining the connectors 114, 116 that are loaded dynamically. The XML configuration file 112 also defines the Progress-Connector 118, which does not include object mapping. The Progress-Connector 118 may be dynamically created at runtime and connects the active synchronizer 102 to the shared progress store 108 for failover handling. Standby synchronizers also connect to the shared progress store 108 through the Progress-Connector 118. The active synchronizer 102 parses the XML configuration file 112 to create the UDC 110 and dynamically create the connectors 114, 116, 118, which may be modified/updated dynamically at run-time.

Advantageously, since the active synchronizer 102 monitors the XML configuration file 112 and caches changes/updates in the UDC, the active synchronizer 102 may add other target stores at runtime without stopping. Since a newly added store does not contain cookies, instead of a delta synchronization, the active synchronizer 102 detects the absence of a valid cookie, which triggers a full store synchronization for the new store. Further, the connectors 114, 116 may be updated in the XML configuration file 112 and dynamically loaded. So, the active synchronizer 102 does not require code changes to change object and attributes for the connectors 114, 116. This avoids shutting down the active synchronizer 102 to change the connectors because XML configuration file 112 changes are applied to upgrade the connectors 114, 116 at runtime.

The Progress-Connector 118 stores progress information dynamically in the progress store 108. Thus since the progress store 108 and Progress-Connector 118 are shared with all synchronizers, standby synchronizers can monitor each synchronization to identify when the active synchronizer 102 is failing or has failed and self-select a new active synchronizer, when necessary. During the first synchronization, all of the synchronizers participate in self-selecting the synchronizer with the shortest synchronization interval as the active synchronizer 102. If all synchronizers use the same interval the synchronizer first executing a synchronization becomes active and remains the active synchronizer 102 until an error, i.e., the active synchronizer 102 misses a synchronization. The Progress-Connector 118 sets the ReplicationInProgress flag during each synchronization to prevent the active synchronizer 102 from restarting synchronization and to prevent standby synchronizers from going active. The Progress-Connector 118 also prevents race conditions from two synchronizers simultaneously checking the ReplicationInProgress flag by locking the ReplicationInProgress flag for one of the two.

Figure 3:
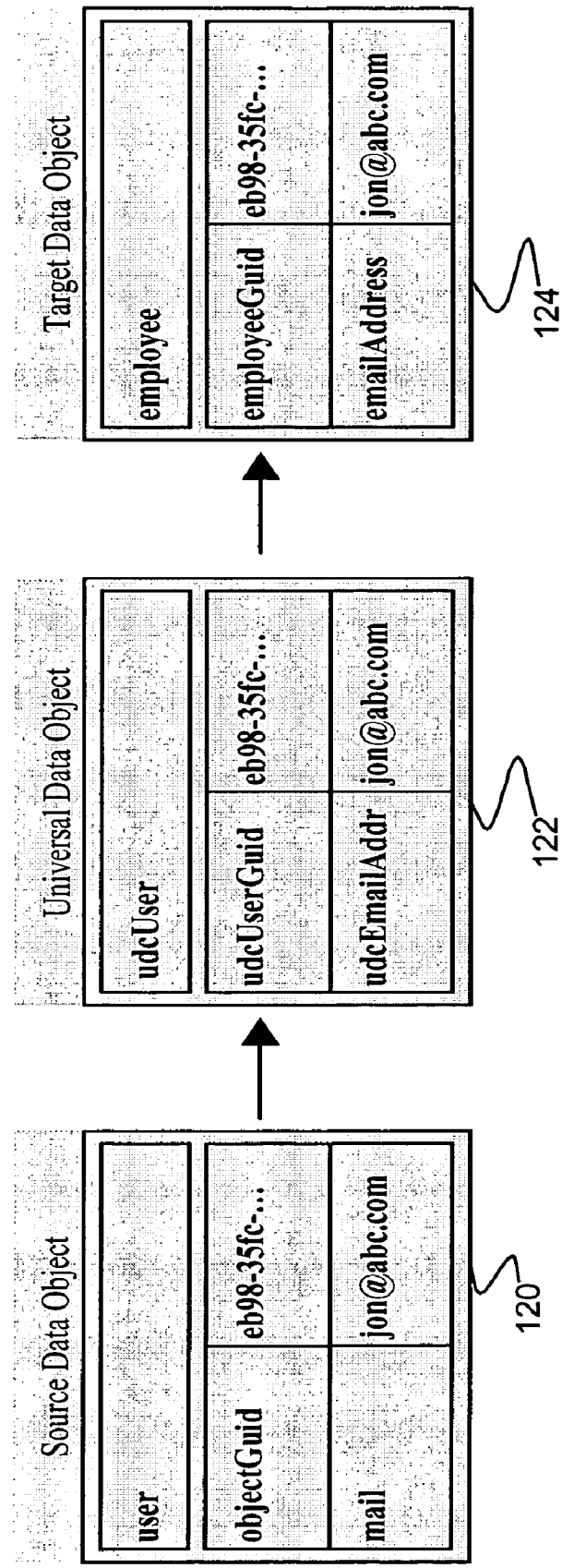
FIG. 3 shows an example of a source data object, an universal data object and a target data object.

FIG. 3 shows an example with reference to FIG. 1 of a source data object 120 from source store 104, represented as an universal data object 122 cached in the UDC 110 and, as a target data object 124 provided to a target store 106. The XML configuration file 112 defines the form of objects traversing each connector 114, 116, 118 and attributes of data traversing each. The In-Connector 114 retrieves changes/updates from the source store 104 and attaches an object name and collects and formats change data as source data objects 120. Each source data object is also associated with a cookie that identifies data changes/updates (e.g., with a timestamp) since the last synchronization interval. Thus, the cookie insures that target store(s) only receive current delta changes on the next synchronization. The UDC 110 modifies and caches each source data object 120 as an universal data object 122 and cookie. The Data Out-Connector 116 converts the universal data object 122 to a target data object 124 that is provided to the target store 106. Only the In-Connector 114 and the Out-Connectors 116 contain object metadata for mapping universal data objects to another format, i.e., the source object and attribute names into a universal name and then, the universal names to the target object and attribute names. Thus, metadata is different for each connector 114, 118 and, especially for each Out-Connecter in a system 100 with multiple target stores.

After formatting a source data object 120, the In-Connector 114 passes the source data object 120 and its associated cookie to the active synchronizer 102. In the active synchronizer 102, the UDC 110 contains source and target data format definitions and cached update objects (preferably, all as metadata that include the synchronized data itself), as well as cached corresponding cookies for each object. The synchronizer 102 also monitors the XML configuration file 112 for changes (e.g., added target stores) and dynamically updates metadata in the UDC 110 for any identified changes. Each Out-Connector 116 converts the normalized data to the appropriate format and forwards the formatted data to the corresponding target data store 106. The UDC 110 seamlessly mates specifically formatted files in data stores 104, 106. So, although an update enters in one format and exits in one or more other formats, as an object passes from the In-Connector 114 through the synchronizer 102 to the Out-Connector 116, the object maintains the same normalized format.

Figure 4A:
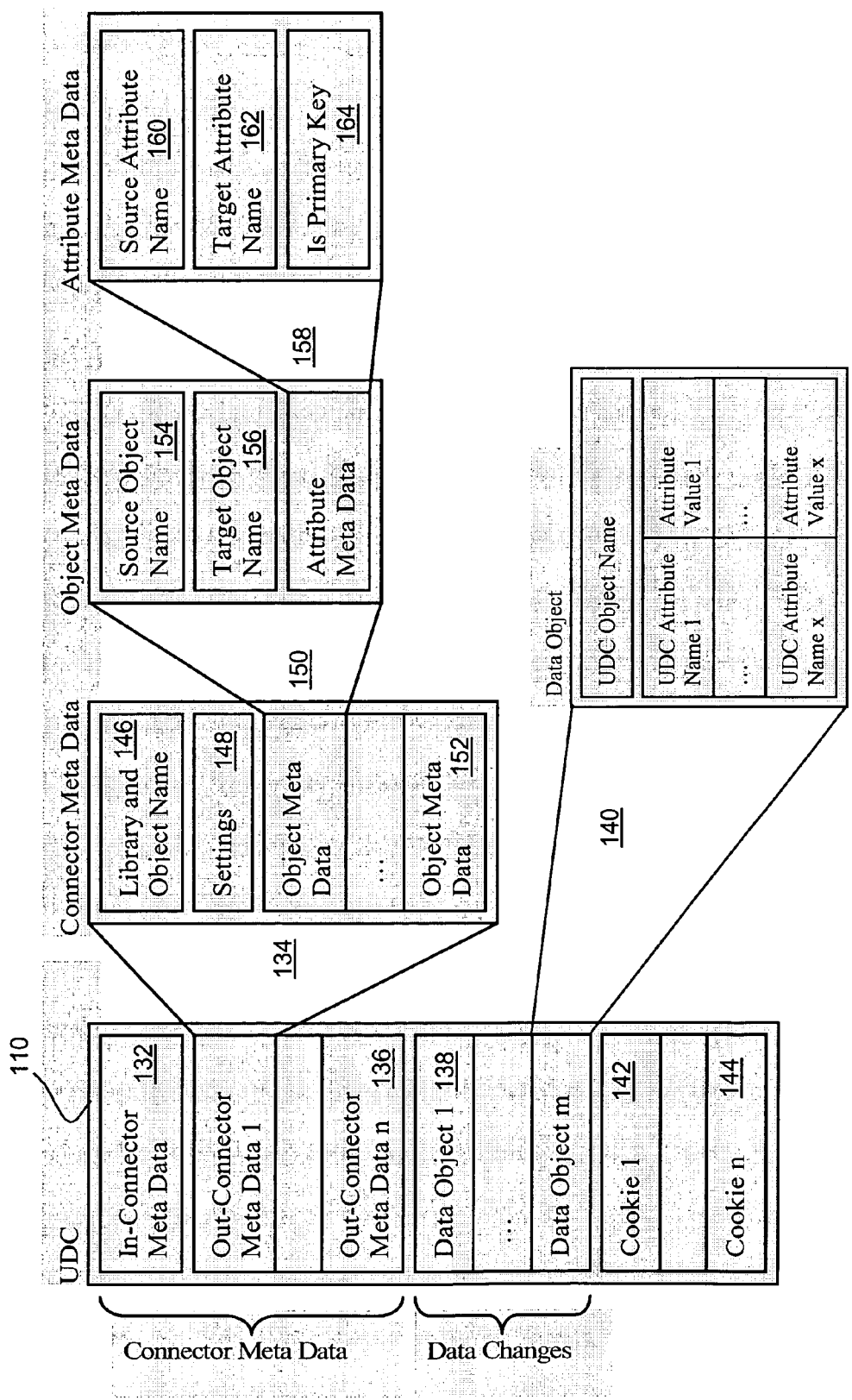
FIGS. 4A-B show general and specific UDC examples.
Figure 4B:
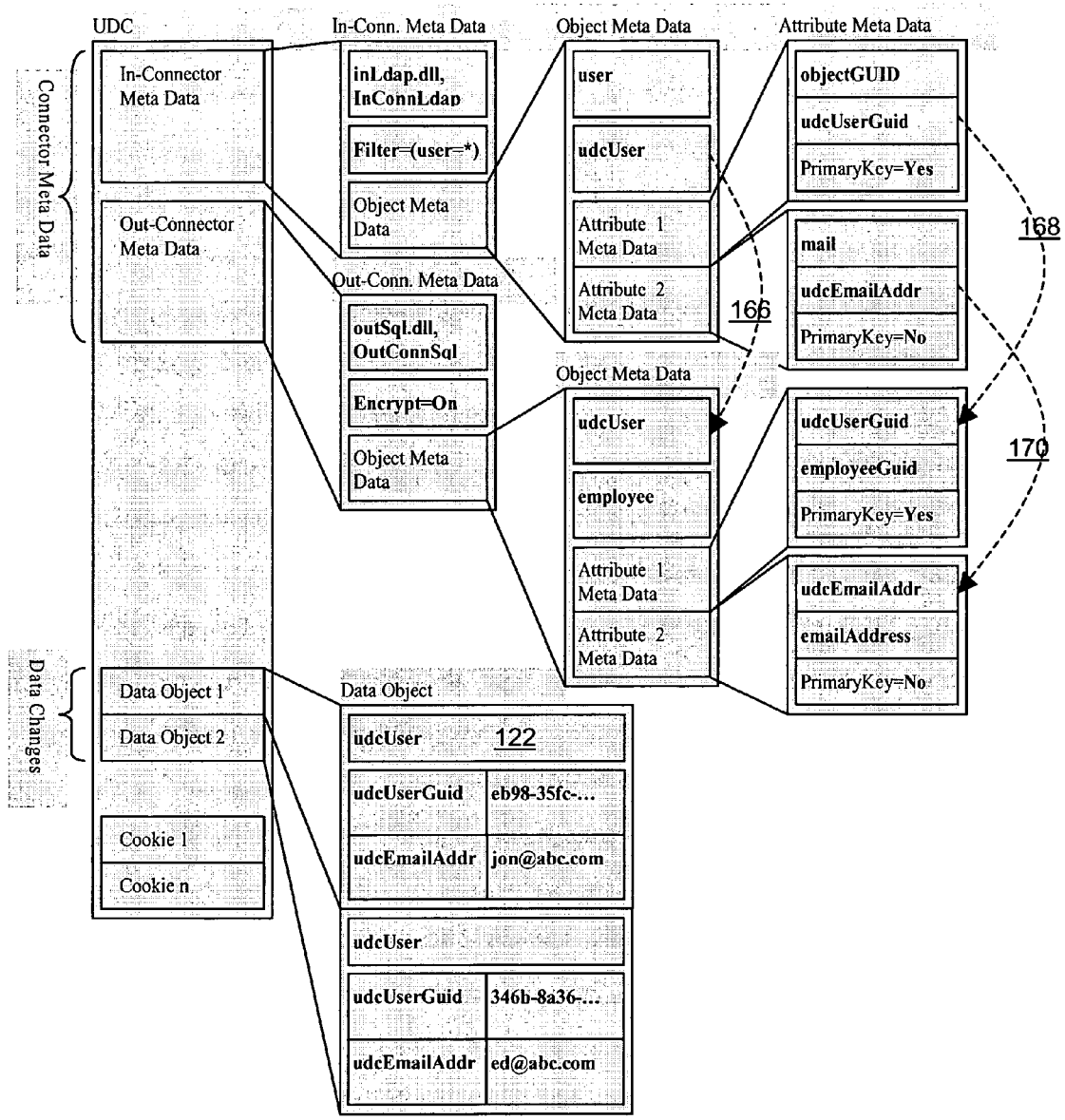

FIGS. 4A-B show a more detailed general example of UDC 110 and, a specific example with the source data object 122 of FIG. 3 cached in the UDC 110. As noted hereinabove, the UDC 110 stores connector metadata 132, 134-136, cached data change objects 138-140 and associated cookies 142-144. In this example, the Progress-Connector 118 is implemented as an Out-Connector and represented as one of the connector metadata 132, 134-136. Thus, connector metadata (except the Progress-Connector 118) includes for each In-Connector and Out-Connector, a library and object name 146, connector settings 148 and object metadata 150-152. Each object metadata includes a source object name 154, a target object name 156 and attribute metadata 158. Attribute metadata 158 includes a source attribute name 160, a target attribute name 162 and an indication whether the attribute metadata 158 is a primary key 164. Changes/updates in the XML configuration file 112 are reflected in metadata 132, 134-136. Further, the relationships between data formatted for the source store and target store are indicated in the example of FIG. 4B with the linking arrows 166, 168, 170. Thus, as can be seen, the UDC 110 is self-describing such that the data objects 138-140 are represented within the synchronizer 102 as normalized data, independent of object and attribute naming requirements for either the source store 104 and/or the target store 106. Advantageously, In-Connector 114 and Out-Connector(s) 116 may have any suitable configuration for any selected data format.

Figure 5:
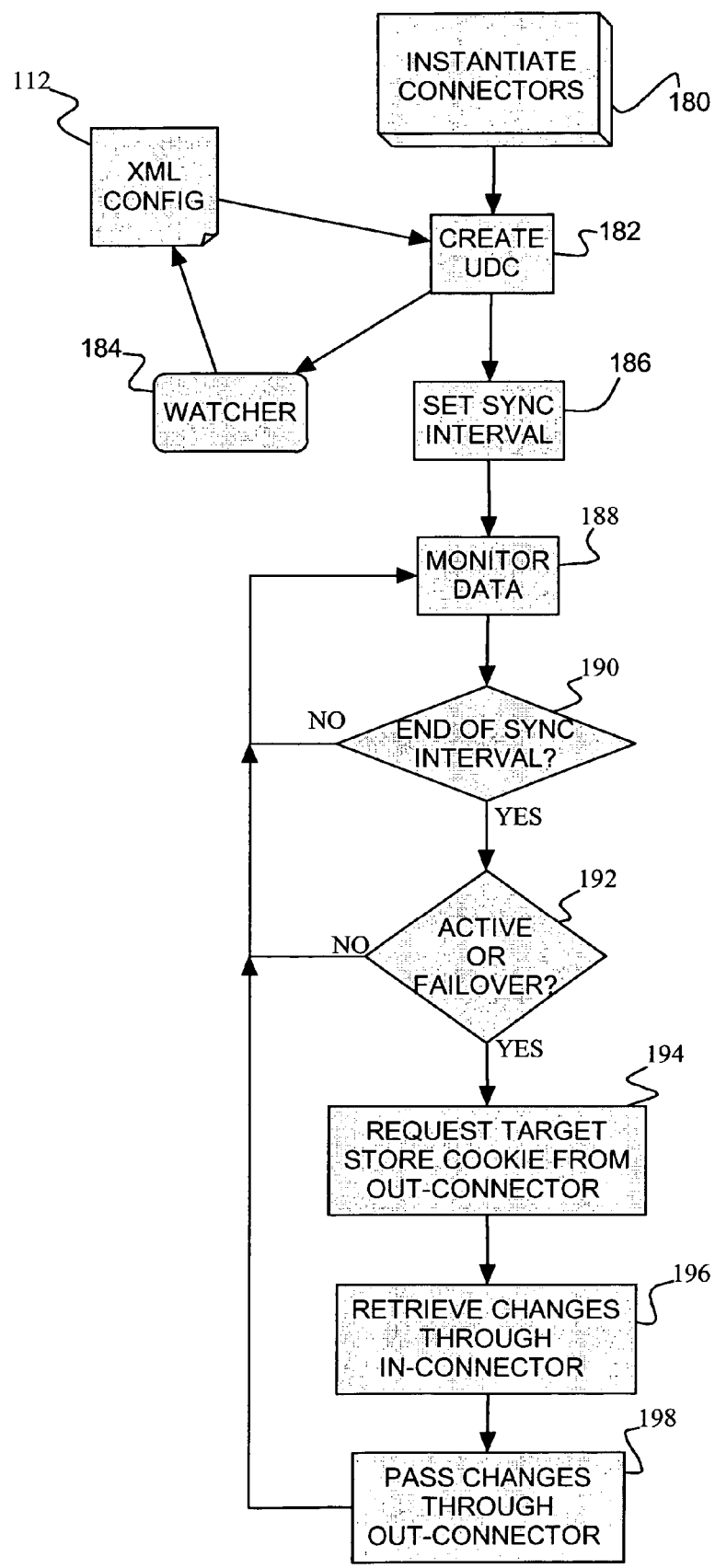
FIG. 5 shows an example of self-selecting the active synchronizer at start up.

FIG. 5 shows an example of a method of self-selecting and starting the active synchronizer, e.g., 102 in FIG. 1. First in step 180, the active synchronizer 102 dynamically instantiates the connectors using the library name and object name of the connector from the XML configuration file 112. In step 182 the active synchronizer 102 creates the UDC 110 from the metadata of the objects and attributes from the XML configuration file. Then in step 184, the active synchronizer 102 sets up a watcher to monitor the XML file 112 for runtime changes, e.g., modifications to the existing Out-Connectors; adding another Out-Connector; adding objects/attributes to be synchronized; changing synchronizer settings such as the synchronization interval. Then, in step 186 the active synchronizer 102 sets up a synchronization interval timer. In step 188 the active synchronizer 102 begins updating for changes/updates and all of the synchronizers begin monitoring for impending failures. After each synchronization interval 190 monitoring pauses, e.g. every 60 sec. In step 192 each synchronizer executes the failover logic guided by the Progress-Connector 118 to check whether it is the active synchronizer. The active synchronizer also determines whether it should start the synchronization interval. In step 194, the active synchronizer requests that the Out-Connector(s) 116 get the cookie(s) from the target store(s) 106 that are stored in the UDC 110. In step 196 changes that have occurred since the last synchronization interval and associated cookies are retrieved/received through the In-Connector 114 and cached in the UDC 110. In step 198 the cached changes are passed to the Out-Connector(s) 116 and to the target store(s) with the associated cookie.

Figure 6:
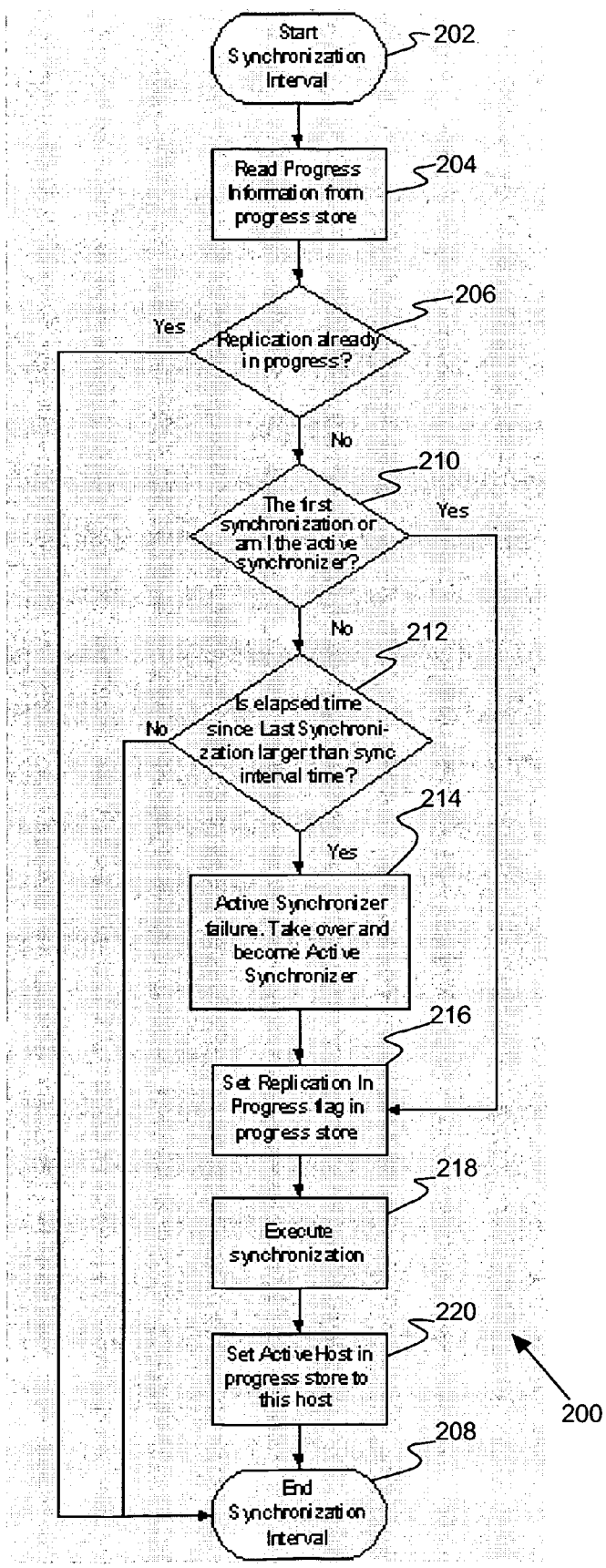
FIG. 6 shows a flow diagram example of failover handling using a preferred Progress-Connector.

FIG. 6 shows a flow diagram 200 example of failover handling using a Progress-Connector (e.g., 118 in FIG. 1) according to a preferred embodiment of the present invention. The First synchronization interval 202 begins with the Progress-Connector 118 implementing a defined interface to access the progress store 108. In step 204 the active and standby synchronizers read progress information retrieved from the progress store 108. Each synchronizer uses the failover logic to check whether it is required to execute a synchronization interval and stay (or become) the active synchronizer. So, in step 206 each synchronizer checks whether an update is already in progress, i.e., another synchronizer is active. If another synchronizer is active, then in step 208, the synchronizer ends the synchronization interval. However, if another synchronizer is not active, then in step 210, the synchronizer checks whether it is designated as the active synchronizer or, the current synchronization is the first synchronization. If another synchronizer is currently active (i.e., it is not active) and a previous synchronization has occurred, then in step 212, the synchronizer checks whether the active synchronizer has missed or failed to complete an update. If the active synchronizer has not missed or failed to complete an update, then in step 208, the synchronizer ends the synchronization interval. Otherwise, in step 214 the active synchronizer has failed and the synchronizer replaces the failed synchronizer. The active synchronizer (either identified in step 210 or newly designated in step 214) begins the update in step 216 by setting a progress flag in the progress store. In step 218 the target stores are synchronized. Then, in step 220 the active synchronizer is designated active host in the progress store 108 and in step 208 the active synchronizer ends the synchronization interval.

Optionally, for a single synchronizer system or where the failover facility is unnecessary, a progress store is unnecessary. The XML configuration file need not list a Progress-Connector in a single synchronizer embodiment. Instead, the synchronizer may use a default Cache Progress-Connector that keeps the progress information in the Progress-Connectors memory cache. Otherwise, however, the single synchronizer functions identically to the above described preferred multiple synchronizer embodiments with XML defined Progress-Connectors.

Advantageously, the failover facility of the Progress-Connector and progress store provides a unique solution to significantly ameliorate data synchronization failures. The preferred failover facility insures that a single active synchronizer much more reliably synchronizes multiple target data stores with data stored in disparate formats with updates from a single source. Special storage is not required for the progress store because the Progress-Connector can use any data format. So, the progress store may be part of one target store, e.g., a SQL database. Thus, the preferred data synchronization system has wide application wherever reliable data synchronization is required.

Additionally, the self-describing universal format of data cached in the UDC is independent of the needs of In-Connectors and Out-Connectors, as well as the Progress-Connector. So, the synchronizer can synchronize data from any source store in any format to any target store in any other format. Also, because the synchronizers continually monitor the XML configuration file, the data synchronization system is flexible enough that it may be reconfigured in runtime by changing the XML configuration file and without changing the synchronizer. New data stores, even storing data in formats not previously handled, can easily be plugged in by changing the XML configuration file. New connectors can be added in runtime for the new stores and created using off-the-shelf tools. Typical such formats may include but are not limited to, for example, data structures such as an LDAP directory, SQL database, XML or any other defined structure files. Generic Connectors such as a LDAP In-Connector used in HiPath™ OpenScape™ can be used in any synchronizer and are fully configured by the XML configuration file. Optionally, a custom connector may be easily created, for a HiPath™ OpenScape™ SQL Out-Connector. Thus, a preferred embodiment system eliminates the need for a new custom designed synchronization system for each situation.

While the invention has been described in terms of preferred embodiments, those skilled in the art will recognize that the invention can be practiced with modification within the spirit and scope of the appended claims. It is intended that all such variations and modifications fall within the scope of the appended claims. Examples and drawings are, accordingly, to be regarded as illustrative rather than restrictive.

What is claimed is:

1. A method of synchronizing data stored in multiple disparate formats, said method comprising the steps of:
   a) instantiating a plurality of connectors, each instantiated connector being associated with a respective one of a plurality of stores, at least two of said stores storing a copy of data being synchronized in first and second formats, said first and second formats being disparate formats;
   b) creating a universal data cache (UDC) caching data in a data format different than said first and second formats;
   c) monitoring each said copy for changes, comprising one or more synchronizers monitoring a configuration file for changes;
   d) identifying an active synchronizer including said universal data cache, said each copy being connected to said active synchronizer through a corresponding one of said instantiated connectors; and
   e) passing changes from a first said copy through said UDC to a second said copy.

2. A method of synchronizing data as in claim 1, wherein changes in said configuration file include addition and removal of ones to said plurality of stores, connectors being added and removed responsive to said changes in said configuration file.

3. A method of synchronizing data as in claim 2, wherein said plurality of connectors are instantiated in step (a) responsive to said configuration file.

4. A method of synchronizing data as in claim 2, wherein said active synchronizer instantiates said connectors in step (a) and in step (U creates said universal data cache responsive to said configuration file.

5. A method of synchronizing data as in claim 4, wherein the step (a) of instantiating connectors comprises:
   i) instantiating an In-Connector at a first store of said plurality of stores, said changes being passed to said In-Connector in said first format and from said In-Connector to said synchronizer in said data format; and
   ii) instantiating an Out-Connector at second store of said plurality of stores, cached changes from said UDC being passed to said Out-Connector from said synchronizer in said data format and from said Out-Connector in said second format.

6. A method of synchronizing data as in claim 2, wherein the step (c) of monitoring comprises:
   i) setting a synchronization interval; and a plurality of synchronizers ii) monitoring at least one said copy for changes until the end of said synchronization interval; and
   iii) checking whether a current active synchronizer has failed to complete a synchronization.

7. A method of synchronizing data in claim 6, wherein if said current active synchronizer has failed to complete a synchronization in step (iii), a standby synchronizer is selected active.

8. A method of synchronizing data as in claim 1, wherein the step (e) of passing changes comprises:
   i) requesting a target store cookie from one of said at least two stores;
   ii) retrieving changes through an In-Connector to said UDC from another of said at least two stores; and
   iii) passing said changes from said UDC to said one.

9. A method of synchronizing data as in claim 1, wherein identifying the active synchronizer in step (d) identifies said active synchronizer from a plurality of synchronizers, remaining ones of said plurality of synchronizers being standby synchronizers selectively becoming active responsive to a synchronization failure between a first store of said plurality of stores and a second store of said plurality of stores in step (e).

10. A method of synchronizing data as in claim 9, wherein the step (e) of passing changes further comprises storing synchronization progress data from passing said changes during a synchronization, said changes being stored in a progress store.

11. A method of synchronizing data as in claim 10, wherein the step (e) of passing changes further comprising the steps of:
   i) reading synchronization progress information from a progress store;
   ii) monitoring synchronization by said active synchronizer; and upon failure of said active synchronizer,
   iii) self-selecting one from said standby synchronizers, said self-selected one being identified as said active synchronizer; and
   iv) resuming synchronization of said plurality of stores.

12. A method of synchronizing data as in claim 11, wherein the step (c) of monitoring comprises:
   i) determining whether said active synchronizer is currently synchronizing; and if not,
   ii) determining whether a period of time has lapsed exceeding a synchronization interval, said self-selected one being selected in step (d) responsive to finding said period of time has lapsed.

13. A method of synchronizing data as in claim 12, wherein the step (iv) of resuming synchronization of said multiple stores comprises:
   i) setting a replication in progress flag in said progress store;
   ii) synchronizing each of said multiple stores; and
   iii) setting said identified self-selected one as active synchronizer in said progress store.

14. A method of synchronizing data as in claim 9, wherein the step (e) of passing changes further comprises serially synchronizing a plurality of copies, wherein after each copy is updated, an In-Connector is instantiated at the respective store and an Out-Connector is instantiated another store being updated, until all copies are updated.

15. A computer-readable medium having stored thereon a plurality of instructions, the plurality of instructions including instructions that, when executed by a processor, cause the processor to:
   a) instantiate a plurality of connectors, each instantiated connector being associated with a respective one of a plurality of stores, at least two of said stores storing a copy of data being synchronized in first and second formats, said first and second formats being disparate formats;
   b) create a universal data cache (UDC) caching data in a data format different than said first and second formats;
   c) monitor each said copy for changes, comprising one or more synchronizers monitoring a configuration file for changes;
   d) self-identify an active synchronizer including said universal data cache, said each copy being connected to said active synchronizer through a corresponding one of said instantiated connectors; and
   e) pass changes from a first said copy through said UDC to a second said copy.

16. A computer-readable medium as in claim 15, wherein changes in said configuration file include addition and removal of stores to said plurality of stores, said processor adding and removing connectors responsive to said changes in said configuration file.

17. A computer-readable medium as in claim 16, wherein said processor instantiates said plurality of connectors in step (a) responsive to said configuration file.

18. A computer-readable medium as in claim 16, wherein said processor creates said universal data cache in step (b) responsive to said configuration file.

19. A computer-readable medium as in claim 18, wherein the step (e) of instantiating connectors changes causes the processor to:
   i) instantiate an In-Connector at a first store of said plurality of stores, said changes being passed to said In-Connector in said first format and from said In-Connector to said synchronizer in said data format; and
   ii) instantiate an Out-Connector at second store of said plurality of stores, cached changes from said UDC being passed to said Out-Connector from said synchronizer in said data format and from said Out-Connector in said second format.

20. A computer-readable medium as in claim 15, wherein the step (e) of passing changes causes the processor to:
   i) request a target store cookie from one of said at least two stores;
   ii) retrieve changes through an In-Connector to said UDC from another of said at least two stores; and
   iii) pass said changes from said UDC to said one of said at least two stores.

21. A computer-readable medium as in claim 15, wherein identifying the active synchronizer in step (d) causes the processor to determine if another synchronizer is currently active from a plurality of synchronizers, said processor remaining a standby synchronizer and selectively becoming active responsive to a synchronization failure between a first store of said plurality of stores and a second store of said plurality of stores in step (e) for a currently active synchronizer.

22. A computer-readable medium as in claim 21, wherein the step (e) of passing changes further causes the processor to store synchronization progress data from passing said changes during a synchronization, said changes being stored in a progress store.

23. A computer-readable medium as in claim 22, wherein the step (e) of passing changes further causes the processor to:
   i) read synchronization progress information from a progress store;
   ii) monitor synchronization by said active synchronizer; and upon failure of said active synchronizer,
   iii) self-select one from said standby synchronizers, said self-selected one being identified as said active synchronizer; and when selected as said active synchronizer
   iv) resume synchronization of said plurality of stores.

24. A computer-readable medium as in claim 23, wherein when another synchronizer is selected as said active synchronizer, the step (c) of monitoring causes the processor to:
   i) determine whether said active synchronizer is currently synchronizing; and if not,
   ii) determine whether a period of time has lapsed exceeding a synchronization interval, said self-selected one being selected in step (d) responsive to finding said period of time has lapsed.

25. A computer-readable medium as in claim 23, wherein the step (iv) of resuming synchronization of said multiple stores causes the processor to:
   i) set a replication in progress flag in said progress store;
   ii) synchronize each of said multiple stores; and
   iii) set said identified self-selected one as active synchronizer in said progress store.

* * * * *